(12) United States Patent
Pittala (10) Patent No.: US 11,491,561 B2
(45) Date of Patent: Nov. 8, 2022

(54) MILLING TOOL WITH COOLANT FLOW GROOVES

(71) Applicant: SANDVIK INTELLECTUAL PROPERTY AB, Sandviken (SE)

(72) Inventor: Gaetano Pittala, Rovereto (IT)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 20 days.

(21) Appl. No.: 16/474,180

(22) PCT Filed: Dec. 13, 2017

(86) PCT No.: PCT/EP2017/082546
§ 371 (c)(1),
(2) Date: Jun. 27, 2019

(87) PCT Pub. No.: WO2018/121989
PCT Pub. Date: Jul. 5, 2018

(65) Prior Publication Data
US 2019/0344364 A1  Nov. 14, 2019

(30) Foreign Application Priority Data
Dec. 28, 2016 (EP) .................................. 16207104

(51) Int. Cl.
*B23C 5/28* (2006.01)

(52) U.S. Cl.
CPC ............ *B23C 5/28* (2013.01); *B23C 2210/40* (2013.01)

(58) Field of Classification Search
CPC ......... Y10T 407/1956; Y10T 407/1958; Y10T 407/1966; Y10T 407/235; Y10T 407/24; Y10T 407/245; Y10T 408/905; Y10T 408/906; Y10T 408/9097; Y10T 409/304032; Y10T 409/304088; B23C 2200/087; B23C 2200/32; B23C 2200/326; B23C 2200/365; B23C 2210/086; B23C 2210/32; B23C 2210/321; B23C 2210/40; B23C 2210/44; B23C 2210/48; B23C 2210/486; B23C 5/10; B23C 5/165;
(Continued)

(56) References Cited

U.S. PATENT DOCUMENTS

| | | | |
|---|---|---|---|
| 1,328,430 A * | 1/1920 | Hathaway ............ | B23D 61/003 144/240 |
| 3,037,264 A * | 6/1962 | Mossberg .................. | B23C 5/28 407/11 |

(Continued)

FOREIGN PATENT DOCUMENTS

| | | | |
|---|---|---|---|
| CA | 2964220 A1 * | 6/2016 | ............... B23C 5/10 |
| EP | 2902528 A1 | 8/2015 | |

(Continued)

*Primary Examiner* — Alan Snyder
(74) *Attorney, Agent, or Firm* — Corinne R. Gorski (57) ABSTRACT

A cutting tool having an elongate cutting head provided with a plurality of teeth and flutes in which a plurality of cooling grooves are recessed at a land region of each tooth between a cutting edge and a trailing edge. The grooves at the land do not extend to and are physically separated from the cutting edge to provide a tool optimized for cutting via radially consistent cutting edges and the promotion of heat exchange and dissipation from the rearward side/region of the teeth.

14 Claims, 6 Drawing Sheets

(58) Field of Classification Search
CPC ....... B23C 5/205; B23C 5/28; B23C 2250/12; B23B 27/143; B23B 2200/087; B23B 2200/323; B23B 2200/325
See application file for complete search history.

(56) References Cited

U.S. PATENT DOCUMENTS

| | | | | |
|---|---|---|---|---|
| 3,597,817 | A * | 8/1971 | Whalley | B23C 5/28 407/11 |
| 4,174,915 | A * | 11/1979 | Peetz | B23C 5/10 407/59 |
| 4,285,618 | A | 8/1981 | Shanley et al. | |
| 4,810,136 | A * | 3/1989 | Paige | B23C 5/10 407/54 |
| 6,045,301 | A * | 4/2000 | Kammermeier | B23B 51/06 408/230 |
| 6,164,876 | A * | 12/2000 | Cordovano | B23C 5/10 407/59 |
| 9,545,678 | B2 * | 1/2017 | Stojanovski | B23C 5/10 |
| 10,335,870 | B2 * | 7/2019 | Swift | B23C 5/00 |
| 2007/0098506 | A1 * | 5/2007 | Flynn | B23C 5/10 407/53 |
| 2012/0082518 | A1 * | 4/2012 | Woodruff | B23C 5/207 407/11 |
| 2014/0140780 | A1 | 5/2014 | Stojanovski | |
| 2014/0193624 | A1 | 7/2014 | Stiens et al. | |
| 2014/0356083 | A1 * | 12/2014 | Budda | B23C 5/10 407/54 |
| 2016/0256939 | A1 * | 9/2016 | Miyamoto | B23C 5/10 |

FOREIGN PATENT DOCUMENTS

| | | | |
|---|---|---|---|
| JP | 2010188451 | | 9/2002 |
| JP | 2006231504 A | | 9/2006 |
| JP | 200828342 A | | 2/2008 |
| JP | 2010188451 A | * | 9/2010 |
| JP | 2013035094 A | | 2/2013 |
| WO | WO-2009122937 A1 * | 10/2009 | ............... B23C 5/10 |
| WO | WO-2015104732 A1 * | 7/2015 | ............... B23C 3/18 |
| WO | 2015114049 A1 | | 8/2015 |

* cited by examiner

Fig 6

MILLING TOOL WITH COOLANT FLOW GROOVES

RELATED APPLICATION DATA

This application is a § 371 National Stage Application of PCT International Application No. PCT/EP2017/082546 filed Dec. 13, 2017 claiming priority to EP 16207104.7 filed Dec. 28, 2016.

FIELD OF INVENTION

The present invention relates to a rotary milling tool having a plurality of cutting teeth formed at an elongate cutting head.

BACKGROUND ART

A wide range of components are machined from many different types of material, with each material having different physical and mechanical characteristics that are influenced by alloying elements, heat treatment, hardness etc. Accordingly, a variety of different cutting and in particular rotary milling tools have been developed to machine workpiece materials. Conventionally, a rotary milling tool comprises a tool body provided with helical or axially straight teeth that are in turn separated by flutes. Due to the high cutting speeds and considerable thermal stresses at the tool, it is common to deliver liquid coolant to the region of the cutting teeth via the flutes. Cooling increases the cutting efficiency of the tool and the service lifetime.

JP 2010-188451 discloses a rotary milling tool comprising helical teeth and flutes. Coolant is supplied to the cutting region via an axially extending internal bore having respective exit ends at radially inner base regions of the flutes.

However, existing rotary milling tools are disadvantageous in a number of respects. As indicated, different workpiece materials exhibit different physical and mechanical characteristics which influence the cutting efficiency and tool service lifetime. In particular, heat resistant super alloys (ISOS materials) are typically regarded as 'sticky' materials that are difficult to cut and reduce significantly tool lifetimes, with the latter due principally to build-up edge (BUE). This wear mechanism results from pressure welding of a chip to the tool and is common for low carbon and stainless steels and aluminium based materials at low cutting speeds. Accordingly, what is required is a milling tool that addresses these problems and in particular is suitable for milling ISOS and other demanding alloys with reduced wear and in particular minimised BUE.

SUMMARY OF THE INVENTION

It is one objective of the present invention to provide a rotary milling tool exhibiting resistance to at least one or a plurality of different wear mechanisms so as to maximise tool service lifetime when applied to machine high demand alloys such as heat resistant super alloys, i.e., ISOS materials that include titanium alloys.

It is a further specific objective to provide a milling tool configured with cutting teeth and flutes in which regions of the cutting teeth are configured to effectively dissipate the high temperatures associated with cutting so as to eliminate or reduce cutting edge wear and in particular build-up edge (BUE) wear. It is a yet further objective to provide a cutting tool enhanced for chip evacuation from the region between the cutting teeth (i.e. the flutes) to further reduce the rate of tool wear and to provide efficient and precise cutting with regard to minimised wall deviation of the machined workpiece.

The objectives are achieved via a cutting tool having an elongate cutting head provided with a plurality of teeth and flutes in which a plurality of cooling grooves are recessed at the land region of each tooth (between a cutting edge and a trailing edge). Importantly, the grooves at the land do not extend to and are physically separated from the cutting edge. Such a configuration is advantageous to provide a tool optimised for cutting via radially consistent cutting edges and the promotion of heat exchange and dissipation from the rearward side/region of the teeth i.e., the trailing edge and clearance face. Each groove at each tooth is recessed at each land to comprise a terminal end that is separated from the cutting edge. This is advantageous to enhance the rate of cooling of the teeth by the channeling of liquid coolant from the flutes and through the grooves whilst not weakening the teeth at the cutting edge. In particular, the cooling effect of the fluid at the highest temperature regions of the teeth (i.e., the cutting edges) is increased as the fluid enters the grooves and is effectively directed and accelerated towards the cutting edges at high speed.

The subject invention, by the specific configuration of the grooves configured to direct the cooling fluid, but having respective terminal ends positioned at the land and spaced-apart from the cutting edge, is advantageous to minimise the occurrence and magnitude of a variety of many different wear mechanisms including for example flank, crater and notch wear, edge chipping and the creation of thermal cracks at the cutting edges. The inventor has identified that the magnitude and the likelihood of occurrence of at least some of these mechanisms would be increased if the cutting edges of the teeth were to be disrupted by recesses or indentations. Accordingly, the subject invention provides a tool enhanced for minimising the working temperature of the cutting edge without compromising tooth strength with regard to cutting edge damage or wear resultant from any one of the above wear mechanisms. In particular, the inventors have identified that by reducing the occurrence of BUE, chip evacuation from the flutes is facilitated.

According to a first aspect of the present invention there is provided a milling tool comprising: an elongate cutting head having a longitudinal axis and plurality of teeth extending axially along the head; each tooth having a rake face terminated at a radially outer region by a cutting edge and a clearance face terminated at a radially outer region by a trailing edge; a plurality of flutes, each flute defined between the rake face and the clearance face of respective adjacent teeth; a land defined between the cutting and the trailing edges at each tooth; characterised by: a plurality of grooves recessed in the trailing edge and extending into the clearance face and the land of each tooth; wherein each of the grooves extend at the land in a direction from the trailing edge to the cutting edge and terminate before reaching the cutting edge.

Preferably, the teeth and the flutes are helical such that the cutting edge and the trailing edge follow a curved helical path around the longitudinal axis of the tool (and the head) with this path deviating from the axis by a helix angle. Optionally, the teeth and the flutes may be aligned generally parallel to the longitudinal axis of the tool so as to be considered straight. Accordingly to such an implementation, the cutting edge and the trailing edge are aligned generally parallel to the longitudinal axis.

Preferably, the tool comprises at least one coolant passage extending axially along the head, the passage having at least one terminal end positioned at a region of at least one of the flutes. More preferably, the at least one coolant passage is formed as at least one internal bore extending within the head, the terminal end being formed as an opening at a radially inner base region of at least one of the flutes. Optionally, the coolant passage may be formed as an open channel, extending axially and recessed within, the base region of at least one of the flutes. According to a preferred implementation, the at least one passage comprises a plurality of terminal ends, each of the ends formed as an opening at the base region of each of the respective flutes. Optionally, the coolant passage comprises one terminal end, between 2 to 8, 3 to 6 or 4 to 6 terminal ends. Optionally, the coolant passage comprises a plurality of terminal ends corresponding to the number of flutes or being less than or more than the number of flutes, with each flute having one or a plurality of openings (exit ends of the coolant supply passage). Accordingly, the present tool is preferably internally cooled by the supply of coolant fluid to the flutes.

The subject invention is advantageous by the orientation of the grooves at the clearance face so as to direct (or channel) the coolant fluid along the clearance face specifically towards the cutting edges. This fluid flow from the radially innermost base regions of the flutes to the radially outermost lands is greatly facilitated by the grooves that effectively shorten the fluid flow pathway between these two regions. The grooves at the region of each trailing edges are further beneficial to increase the surface area of the rotationally rearward regions of the teeth so as to provide a cooling 'radiator' effect for heat dissipation from the region of the cutting edges.

Optionally, a distance by which each of the grooves extend widthwise across the land from the trailing edge towards the cutting edge is in the range equal to or less than 80%, equal to or less than 50%, 10 to 50%, 20 to 50%, 20 to 40%, 25 to 40% or 30 to 40% of a width of the land between the cutting edge and the trailing edge in a direction aligned perpendicular to a longitudinal direction along which the cutting edge and the trailing edge extend. Where the teeth (and the flutes) are helical, the width of the land is aligned perpendicular to the helix angle at which the cutting edge and the trailing edge extend. Where the teeth (and the flutes) are aligned generally parallel to the longitudinal axis of the tool, the width of the land is aligned perpendicular to the longitudinal axis of the tool and hence perpendicular to the axial alignment of the cutting edge and the trailing edge. This relative distance by which the grooves extend widthwise across the land is advantageous to provide a compromise between maximising the cooling effect of the grooves whilst not 'weakening' the teeth and increasing a likelihood of additional wear mechanisms such as flank or notch wear or the creation of thermal cracks.

Optionally, a distance in a radial direction by which each of the grooves extent along the clearance face is less than 50%, less than 40%, less than 35%, in a range 5 to 50%, 5 to 40%, 10 to 40%, 15 to 30% or 20 to 30% of a corresponding depth of each of the flutes along a radius between a radially deepest region of each flute and a radial position of a cutting circle as defined by the cutting edges. Similarly, such a configuration provides a suitable compromise between enhanced cooling and maintaining a structural integrity and hence maximised tool service lifetime.

Preferably, a respective maximum length, width and depth of each of the grooves at the teeth is uniform. As will be appreciated, such a configuration provides a rotationally balanced tool. Optionally, each of the grooves comprise a V-shaped profile recessed within the clearance face. However, according to further implementations, the grooves may comprises any angular or curved cross sectional profiles defined by one or a plurality of groove surfaces that define the walls and/or base of the grooves. Optionally, the grooves may comprises a rectangular or square cross sectional profile, a part circular cross sectional profile or a U-shaped cross sectional profile.

Optionally, at the clearance face, a width of each of the grooves increases in a direction from a radially deepest (i.e., radially innermost) region to a radially outermost region of the head i.e., the cutting edge at each land. Optionally, at the land, a width of each of the grooves increases in a direction from the cutting edge to the trailing edge. Such a configuration is advantageous to direct and potentially accelerate the delivery of the coolant fluid to the cutting edge in addition to minimising any effect on the structural integrity of the teeth resultant from the present of the grooves. Preferably, an orientation of each groove in a lengthwise direction of each groove is substantially perpendicular to the longitudinal axis of the head. Such a configuration is advantageous to provide the required angle of delivery (or channeling) of the coolant fluid from within the flutes towards the cutting edges.

Optionally, each of the grooves are separated from one another in the direction of the longitudinal axis of the head by a distance being approximately equal to a width of the land in a direction between the cutting edge and the trailing edge. This relative spacing of the grooves in the axial direction again provides the appropriate balance between maximising the cooling effect of the groove whilst minimising a 'theoretical volume' of material removed from the radially outer region of the teeth due to the presence of the grooves. Optionally, and according to specific implementations, each tooth comprises in the range 10 to 40, 15 to 35 or 20 to 30 grooves at the trailing edge.

Preferably, the tool comprises a shaft (alternatively termed a shank) extending from one axial end of the head. Optionally, the shaft may be formed integrally or non-integrally with the head. Where the shaft is formed non-integrally with the head, the tool may comprise at least one mounting interface so as to provide a coupling between the shaft and the head.

Preferably, the tool comprises a surface coating or film provided at substantially all or a portion of the tool head. Optionally, the coating comprises a super hard material such as a polycrystalline based material, polycrystalline diamond, cubic boron nitride, or the like with such further coatings being familiar to those skilled in the art.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
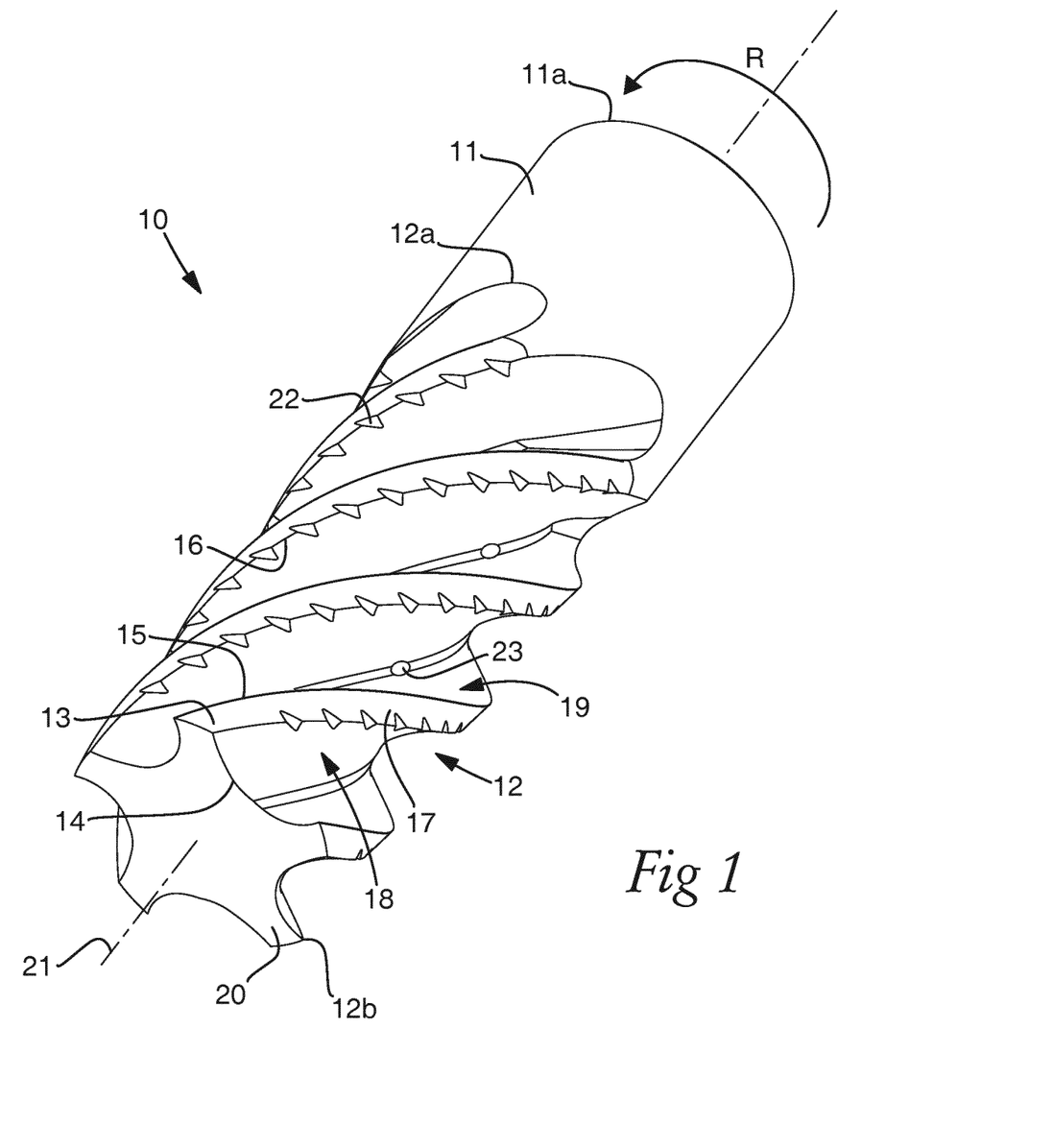
FIG. 1 is a perspective view of a rotary milling tool comprising a plurality of helical teeth separated by helical flutes according to a specific implementation of the present invention.
Figure 2:
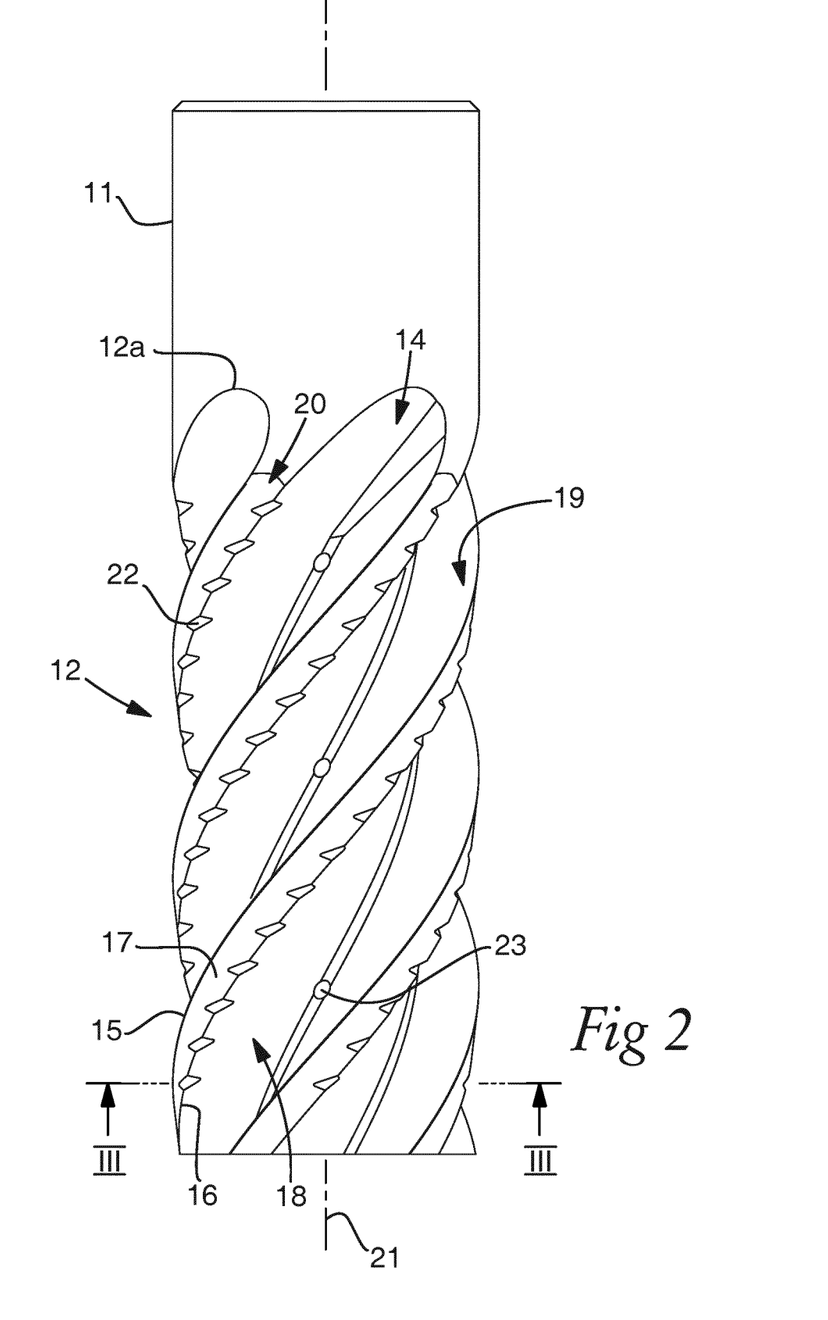
FIG. 2 is a side perspective view of the tool of FIG. 1.

Referring to FIGS. 1 and 2 an elongate rotary milling tool 10 comprises a head indicated generally by reference 12 and a shaft 11 formed integrally with head 12, with both the head 12 and shaft 11 having a common longitudinal axis 21. Head 12 is provided with 5 helical cutting teeth 20 that extend continuously from a first proximal head end 12*a* (positioned at the junction between head 12 and shaft 11) and a second distal (or terminal) head end 12*b*.

Teeth 20 are formed as raised ridges extending axially and radially at head 12 relative to axis 21 with neighbouring teeth 20 being separated by corresponding helical flutes 14 in a circumferential direction around axis 21. Accordingly, each tooth 20 is defined by a clearance face 18 and an opposite rake face 19 with a thickness (in the circumferential direction) of each tooth 20 being defined between the opposed clearance and rake faces 18, 19. Clearance face 18 is terminated at a radially outermost region by a helically extending trailing edge 16 with the rake face 19 terminating similarly at a radially outermost region as a cutting edge 15. A land 17 is defined between the trailing and cutting edges 16, 15, with land 17 extending axially between the head first and second ends 12*a*, 12*b*. An internal bore (not shown) extends axially through tool 10 (including shaft 11 and head 12). In particular, the internal bore extends from a terminal end 11*a* of shaft 11 into the region of head 12. In particular, the internal bore comprises five terminal ends formed as openings 23 positioned at a radially deepest/innermost base region of each flute 14. Accordingly, a coolant fluid is capable of being introduced to the cutting regions of tool 10 via the internal bore so as to deliver the fluid into the flutes 14 via openings 23.

According to the subject invention, a plurality of grooves are recessed into each trailing edge 16 with the grooves 22 being spaced apart axially (at trailing edge 16) between head first and second ends 12*a*, 12*b*. A region 13 positioned axially towards head second terminal end 12*b* is devoid of grooves 22 so as to comprise a continuously curved trailing edge 16 that is not interrupted by grooves 22. A corresponding region (devoid of grooves 22) is also provided at the opposite second end 12*b*. According to the specific implementation, each tooth 20 comprises sixteen grooves 22 spaced apart by a uniform separation distance in the axial direction between head ends 12*a* and 12*b*.

FIGS. 1 and 2 illustrate schematically second distal head end 12*b*. In particular head end 12*b* according to the subject invention would typically be provided with axial end teeth that would represent an axial forwardmost cutting end of tool 10. Such teeth would typically be aligned to extend radially from axis 21, with each tooth having one or a plurality off cutting edges and/or faces representing axial terminal ends of each of the teeth 20.

As will be appreciated, tool 10 is intended for rotation about axis 21 according to rotational direction R so as to drive cutting edges 15 into a suitable workpiece (not shown) so as to provide the desired rotary milling action. As will be appreciated, chipped material is forced to pass along the rake faces 19 followed by contact with the clearance faces 18 from where the chips are evacuated from the flutes 14 via the trailing edges 16. The supply of cooling fluid into flutes 14 facilitates both chip evacuation and serves to minimise and regulate the temperature of the tool 10 at the radially outer regions of teeth 20 (resultant from the high cutting speeds with which tool 10 is typically rotated about axis 21).

Figure 3:
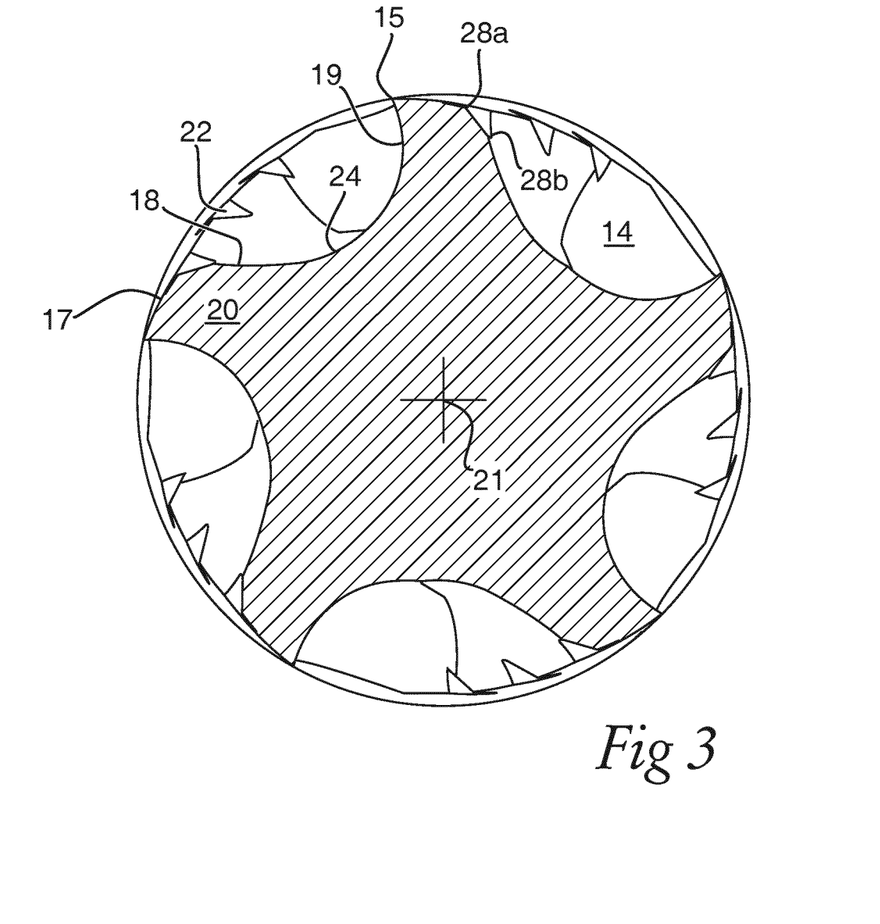
FIG. 3 is a cross sectional view through III-III of the tool of FIG. 2.
Figure 4:
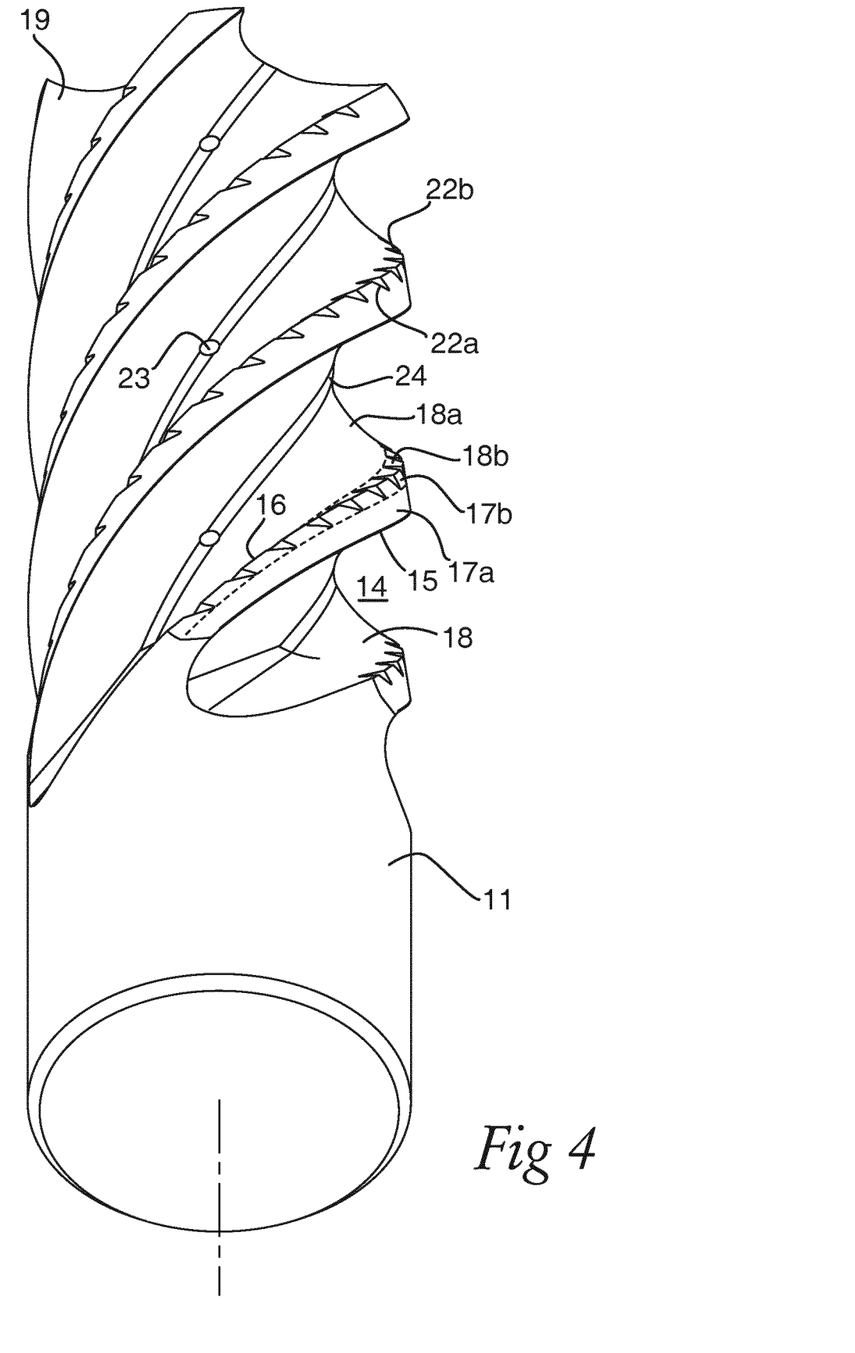
FIG. 4 is a further perspective view of the tool of FIG. 2.

Referring to FIGS. 3 and 4, each groove 22 is recessed into each tooth 20 at the region of trailing edge 16 so as to comprise a first portion indicated generally by reference 22*a* that is recessed within and extends along a portion of land 17 (between the trailing and cutting edges 16, 15) and a second portion indicated generally by reference 22*b* that is recessed within and extends along a portion of clearance face 18. Each complete groove 22, (encompassing first portion 22*a* and second portion 22*b*) comprises a maximum length orientated approximately perpendicular to axis 21, with the length 30 defined between a groove first end 28*a* (positioned at land 17) and a groove second end 28*b* (positioned at clearance face 18). According to the specific implementation, a cross sectional profile of each groove 22 in a plane perpendicular to the groove length 30 is generally V-shaped along the full length of each groove 22 between ends 28*a*, 28*b*. Accordingly, the inner cavity region of each groove 22 is defined by a pair of opposed planar groove faces 29*a*, 29*b* aligned transverse to one another. According to the specific implementation, a length of groove portion 22*b* (within land 17) is approximately equal to groove portion 22*b* (within clearance face 18).

Figure 5:
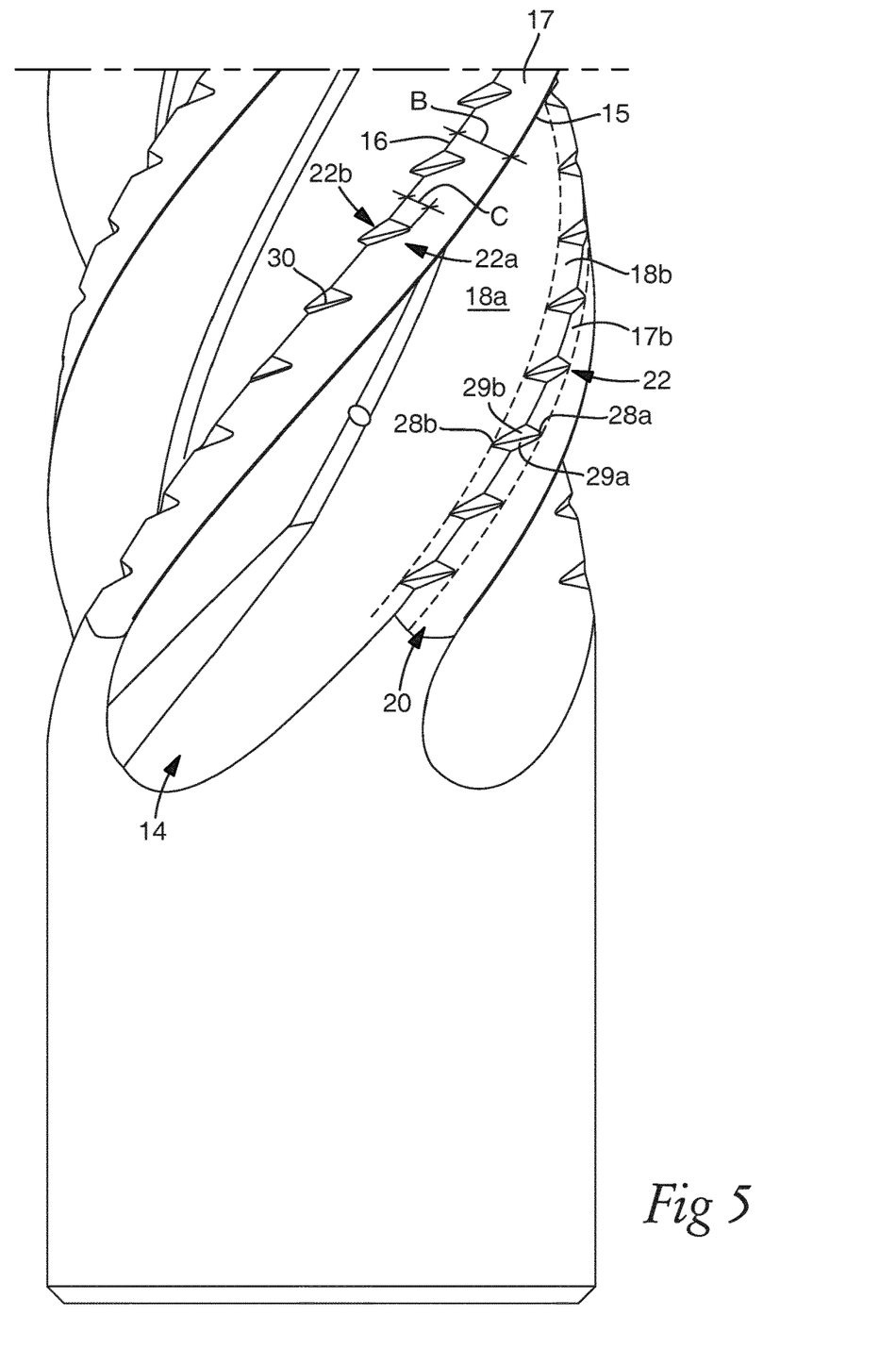
FIG. 5 is a perspective view of the helical cutting teeth and flutes of the tool of FIG. 2 according to the specific implementation of the present invention.

As illustrated in FIG. 5, groove first end 28*a* is spatially separated from cutting edge 15 such that the land 17 may be considered to be divided in the widthwise direction of the land (in the direction perpendicular to the path of a respective tooth 20) into a first portion 17*a* (positioned closest to cutting edge 15) and a second portion 17*b* (positioned closest to trailing edge 16). Land first portion 17*a* is accordingly devoid of grooves 22 such that the land at portion 17*a* in the helical direction of each tooth 20 is formed by a generally smooth uninterrupted radially outward facing surface that defines a radially outermost region of each tooth 20. In contrast, land portion 17*b* in the helical direction of each tooth 20 is interrupted by the recessed grooves 22 so as to define a part ridged or profiled surface relative to the non-profile land portion 17*a*. Similarly, each clearance face 18 may be considered to be divided in a radial direction into a first radially inner portion 18*a* and a second radially outer portion 18*b*. Inner portion 18*a* is devoid of grooves 22 and is accordingly formed as a smooth generally continuously curved surface. In contrast, the radially outer portion 18*b* is formed as a part ridged region that is interrupted by the recessed grooves 22. Accordingly, the radially outer portion 18*b* of each clearance face 18 is profiled or ribbed relative to the radially inner portion 18*a*.

According to the specific implementation and referring to FIG. 5, a distance C by which groove portion 22*a* extends across the land 17 (in the widthwise direction of the land) from trailing edge 16 to cutting edge 15 is less than 50% of a total width B of land 17 in a direction between the cutting and trailing edges 15, 16. According to the specific implementation, distance C is approximately 30 to 40% of distance B. Accordingly, land first portion 17*a* is wider in the axial direction than land second portion 17*b*. However, due to the presence of grooves 22, the total surface area at land second portion 17*b* is increased due to the presence of grooves 22 and in particular groove faces 29*a*, 29*b*. Clearance face portion 18*b* also comprises a relatively enlarged surface area due to groove faces 29*a*, 29*b* within groove portion 22*b* extending within clearance face 18.

Figure 6:
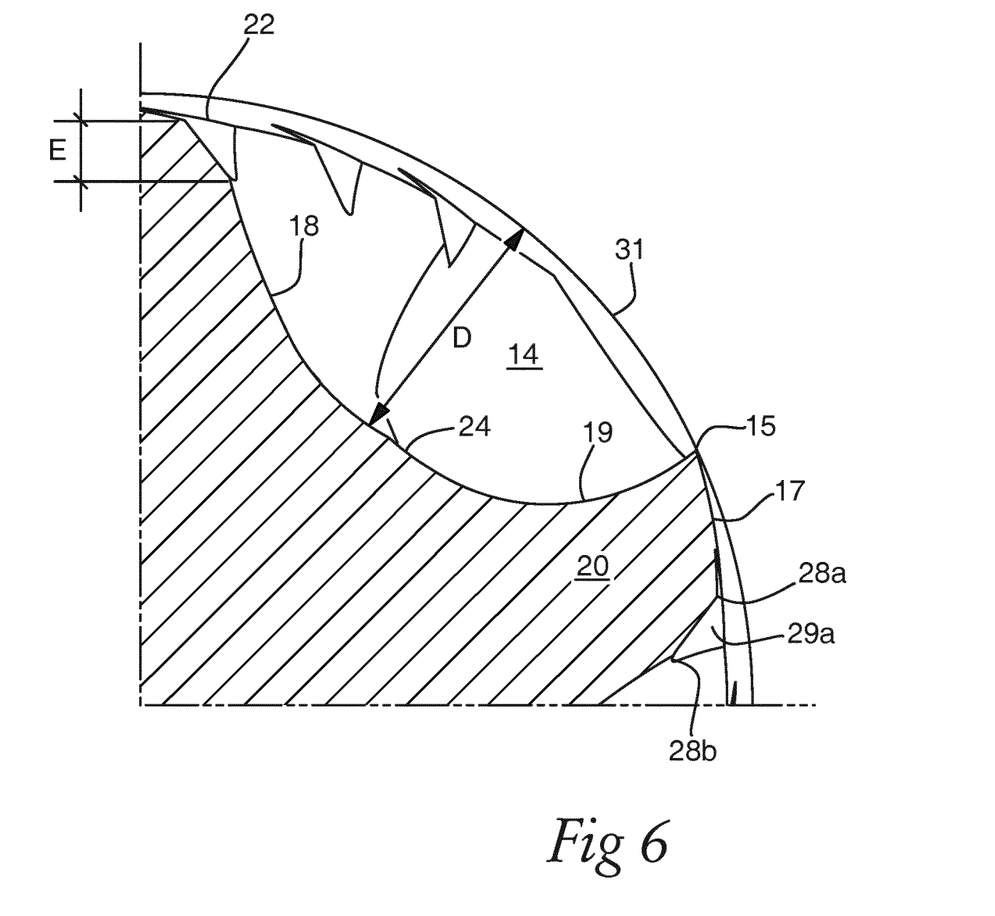
FIG. 6 is a magnified cross sectional view of a radially outer region of the cutting teeth of the tool of FIG. 2.

Referring to FIG. 6, a distance E by which each groove 22 extends along the radius of tool 10 is less than the full/complete depth D of each flute 14 as defined by the distance along the radius of head 12 between a cutting circle 31

(which is, in turn, defined by the cutting edges 15) and the radially deepest region 24 of each flute 14. In particular, and according to the specific implementation, distance E is in a range 20 to 30% of distance D. Accordingly, the radially inner region 18a represents a majority of clearance face 18 and is devoid of grooves 22.

Spatially separating grooves 22 from cutting edge 15, via the non-grooved portion 17a, maintains the structural integrity of teeth 20 and accordingly avoids undesirable and accelerated wear of the cutting edges 15 according to any one or a plurality of wear mechanisms including in particular the creation of thermal cracks or the occurrence of notch or flank wear. Grooves 22, having portion 22a extending within land 17 and portion 22b extending within clearance face 18, are beneficial to facilitate delivery of the cooling fluid to the peripheral region of teeth 20 and in particular to the cutting edges 15. Additionally, the shape profile of the grooves 22 having a width (perpendicular to groove length 30) that i) increases at clearance face 18 (in a radial direction from flute base region 24 to trailing edge 15) and ii) decreases at land 17 (in the axial direction from trailing edge 16 to cutting edge 15) is advantageous to deliver at high speed the coolant fluid from the region of the flutes 14 to the cutting edges 15. The radially outward coolant flow speed and the 'channeled' delivery of coolant at the clearance face 18 may be selectively adjusted by a variation of a respective groove length 30 and groove width at both the clearance face 18 and land 17. That is, and according to further embodiments, groove second end 28b may be positioned at, towards or beyond a mid-radial depth D of each flute 14.

Grooves 22 are further advantageous to facilitate chip evacuation from each flute 14. The enhanced chip evacuation may be due, in part, to a reduction in the magnitude and likelihood of occurrence of built-up-edge (BUE) at the region of cutting edge 15 resultant, in turn, from the dissipation and reduction of the heat at the region of the cutting edge 15. That is, the present configuration of teeth 20 having grooves 22 may be considered to provide a 'radiator' effect that maximises a temperature differential between cutting edge 15 and the region of trailing edge 16. This effect may be due firstly to the increased surface area at portions 17b, 18b and secondly due to the increased channeling and therefore volume/delivery rate of the cooled fluid in a direction specifically towards the cutting edges 15.

The invention claimed is:

1. A milling tool comprising:
   an elongate cutting head having a longitudinal axis and a plurality of teeth extending axially along the head;
   each tooth having a rake face terminated at a radially outer region by a cutting edge and a clearance face terminated at a radially outer region by a trailing edge, wherein, for each tooth, a radial distance from the longitudinal axis to the cutting edge is greater than a radial distance from the longitudinal axis to the trailing edge;
   a plurality of flutes, each flute being defined between the rake face and the clearance face of respective adjacent teeth;
   a land defined between the cutting and the trailing edges at each tooth;
   a plurality of grooves recessed in the trailing edge and extending into the clearance face and the land of each tooth, wherein the grooves are configured to direct coolant fluid towards the cutting edge, wherein each of the grooves extend at the land in a direction from the trailing edge to the cutting edge and terminates before reaching the cutting edge, wherein a distance by which each of the plurality of grooves extends widthwise across the land from the trailing edge towards the cutting edge is in the range equal to or less than 80% of a width of the land between the cutting edge and the trailing edge in a direction aligned perpendicular to a longitudinal direction along which the cutting edge and the trailing edge extend; and
   at least one coolant passage extending axially along the head, the at least one coolant passage having at least one terminal end positioned at a region of at least one of the flutes.

2. The tool as claimed in claim 1, wherein the at least one coolant passage is formed as at least one internal bore extending within the head, the at least one terminal end of the at least one passage being formed as an opening at a radially inner base region of at least one of the flutes.

3. The tool as claimed in claim 2, wherein the at least one passage includes a plurality of terminal ends, each of the plurality of terminal ends being formed as an opening at the base region of each of the respective flute.

4. The tool as claimed in claim 1, wherein said range is 20 to 80%.

5. The tool as claimed in claim 1, wherein said range is equal to or less than 50%.

6. The tool as claimed in claim 1, wherein a distance in a radial direction by which each of the plurality of grooves extends along the clearance face is less than 50% of a corresponding depth of each of the flutes along a radius between a radially deepest region of each flute and a radial position of a cutting circle as defined by the cutting edges.

7. The tool as claimed in claim 6, wherein said distance is in the range 5% to 40% of said radial depth of each of the flutes.

8. The tool as claimed in claim 1, wherein a respective maximum length, width and depth of each of the grooves at the teeth is uniform.

9. The tool as claimed in claim 1, wherein each of the grooves has a V-shape profile recessed within the clearance face.

10. The tool as claimed in claim 1, wherein at the clearance face a width of each of the plurality of grooves increases in a direction from a radially innermost region to a radially outermost region of the head.

11. The tool as claimed in claim 1, wherein at the land, a width of each of the plurality of grooves increases in a direction from the cutting edge to the trailing edge.

12. The tool as claimed in claim 1, wherein each of the plurality of grooves are separated from one another in the direction of the longitudinal axis of the head by a distance being approximately equal to a width of the land in a direction between the cutting edge and the trailing edge.

13. The tool as claimed in claim 1, wherein each tooth has in the range 10 to 30 grooves at the trailing edge.

14. The tool as claimed in claim 1, further comprising a shaft extending from one axial end of the head.

* * * * *